June 23, 1925. 1,543,623
S. R. SMART
LOAD LEVELER
Filed April 9, 1924 3 Sheets-Sheet 3
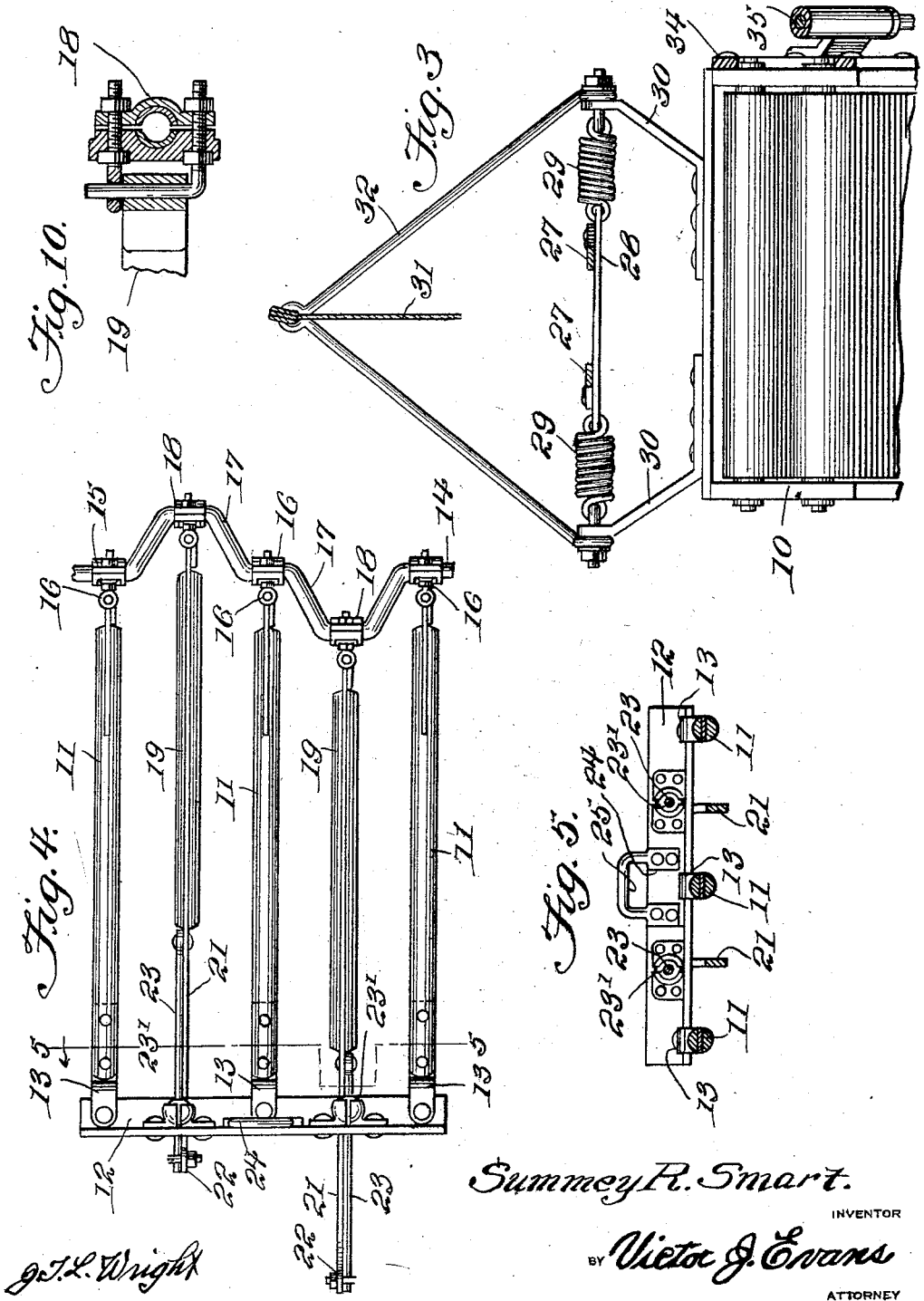

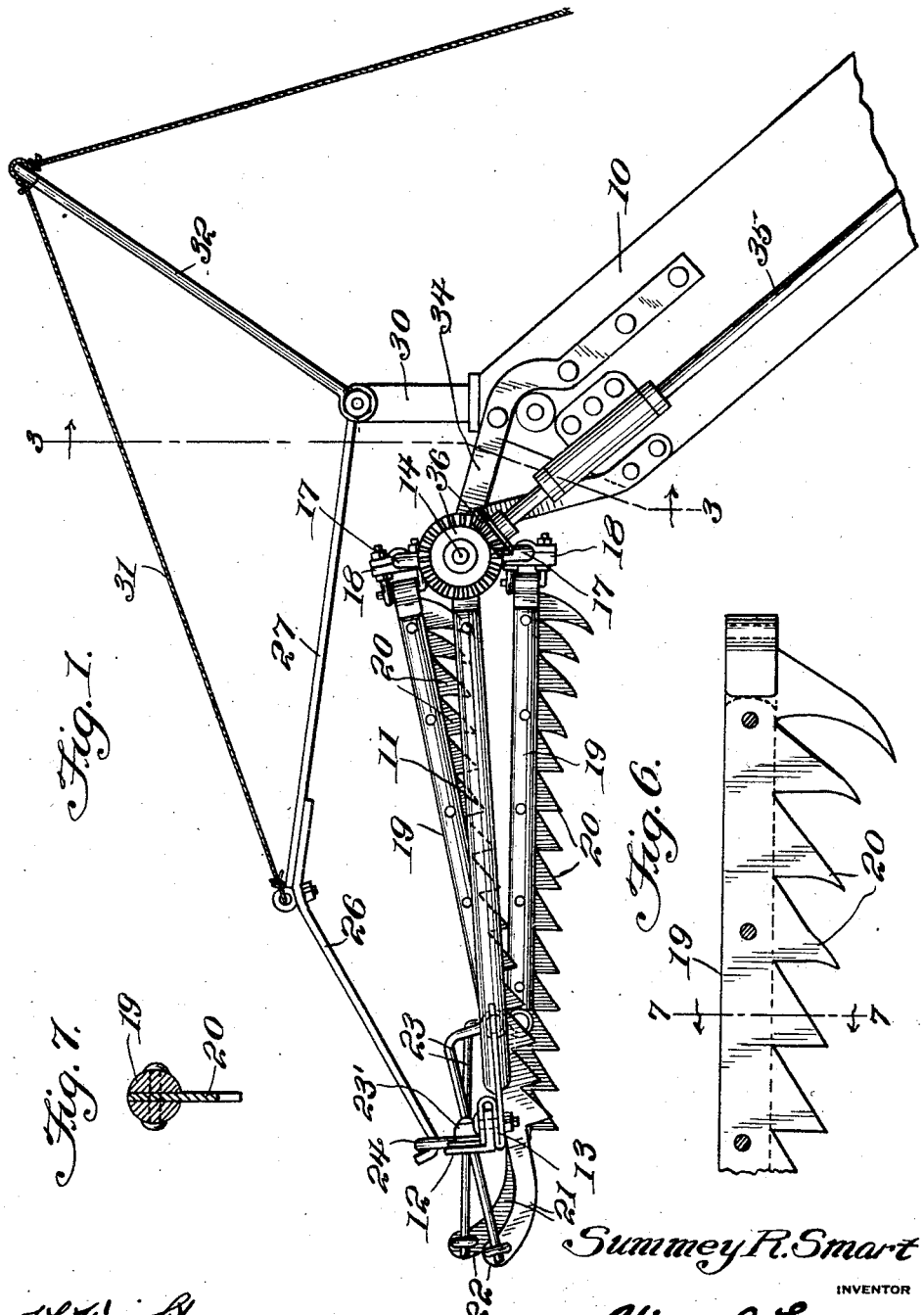

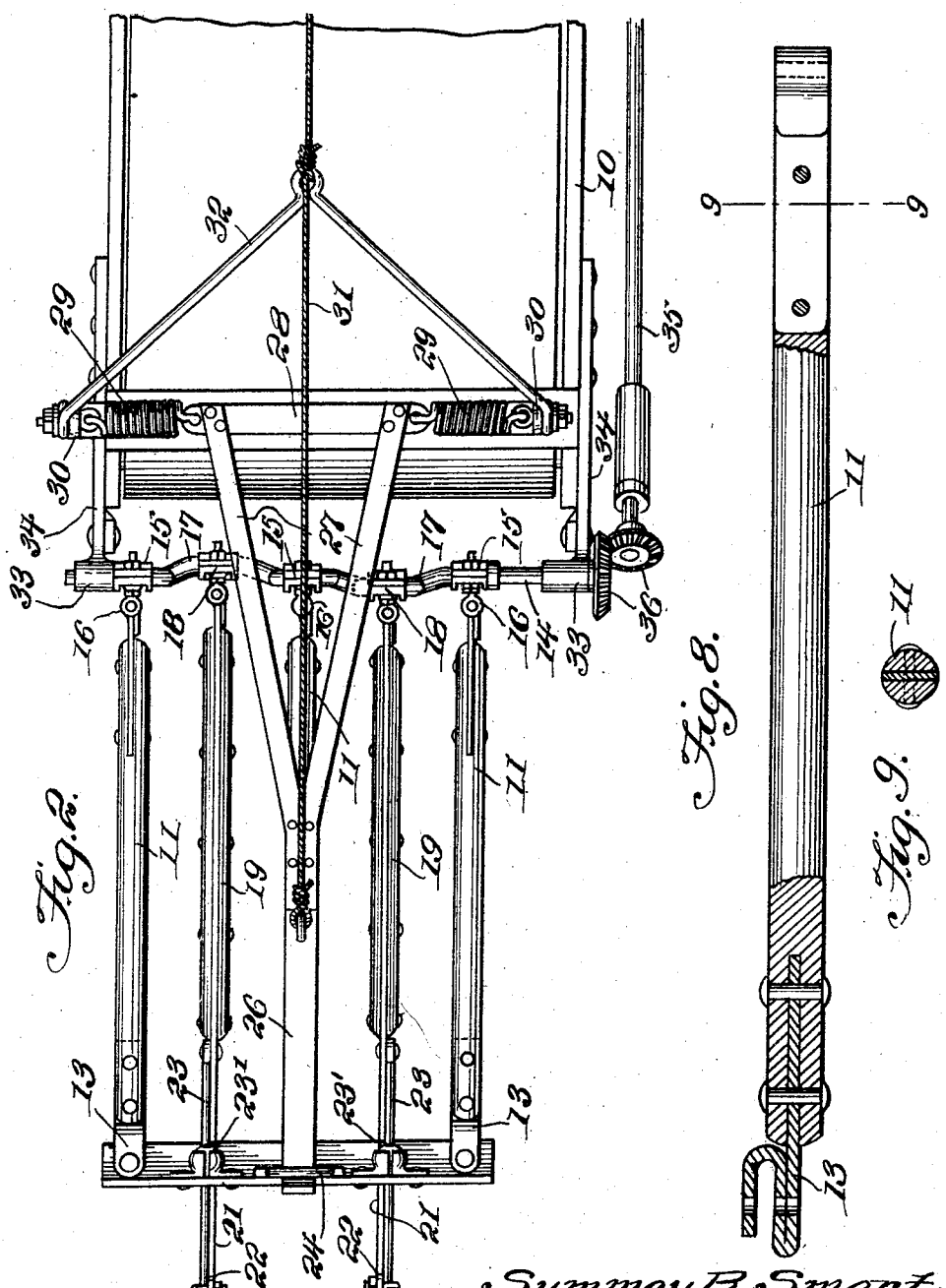

Patented June 23, 1925.

1,543,623

UNITED STATES PATENT OFFICE.

SUMMEY R. SMART, OF CIRCLE, MONTANA.

LOAD LEVELER.

Application filed April 9, 1924. Serial No. 705,299.

*To all whom it may concern:*

Be it known that I, SUMMEY R. SMART, a citizen of the United States, residing at Circle, in the county of McCone and State of Montana, have invented new and useful Improvements in Load Levelers, of which the following is a specification.

This invention relates to improvements in agricultural machines and has especial relation to grain heading machines, an object being to provide means which may be supported by the elevator of a grain header for the purpose of leveling the loaded grain in the header box or barge and thus load the said barge or box to its capacity without wasting the grain and at the same time dispensing with the services of a man usually employed for this purpose.

Another object of the invention is the provision of a load leveler which may be yieldingly and adjustably supported by the elevator so as to provide for variations of travel between the header and the header boxes, the load leveler remaining in proper operative relation to the said box at all times.

A further object of the invention is the provision of means whereby the leveler may be operated from the operating mechanism of the header.

With the above and other objects in view, the invention further includes the following novel features and details of construction, to be hereinafter more fully described, illustrated in the accompanying drawings and pointed out in the appended claims.

In the drawings:—

Figure 1 is an elevation showing a portion of the elevator of a grain heading machine with the invention secured thereto.

Figure 2 is a plan view of the same.

Figure 3 is an end view.

Figure 4 is a plan view of the rakes and frame showing the rakes in a different position from that of Fig. 2.

Figure 5 is a transverse section.

Figure 6 is an enlarged fragmentary elevation of one of the rakes.

Figure 7 is a section on the line 7—7 of Figure 6.

Figure 8 is an enlarged elevation partly broken away showing one of the parallel bars of the frame.

Figure 9 is a transverse section of the same.

Figure 10 is an enlarged section showing the connection between the crank shaft and one of the rakes.

Referring to the drawings in detail wherein like characters of reference denote corresponding parts, the reference character 10 indicates a portion of the elevator of a grain heading machine to which the invention is shown as applied.

The load leveler which constitutes the present invention comprises a frame which includes longitudinally disposed spaced parallel bars 11 which are connected at one end by a transverse bar 12, the latter being preferably formed of angle iron and connected to the said bars 11 as shown at 13, so that the bar 12 will occupy a plane above the bars 11. The opposite ends of the bars 11 are connected by a crank shaft 14 which forms one end of the frame. This shaft is mounted in bearings 15 which are connected to the bars 11 as shown at 16 so as to permit of pivotal movement of the frame upon the shaft 14 without binding.

Connected to the cranks 17 of the shaft 14 as shown at 18 are leveling elements or rakes 19. These rakes 19 include teeth 20 and when the said rakes are moved longitudinally through their operative connection with the shaft 14, these teeth will act to move the grain in the direction away from the end of the elevator 10.

The outer ends of the rakes 19 are provided with extensions 21 whose extremities extend upward as at 22. The extensions 21 of the rakes are positioned beneath the bar 12, while extending through pivoted slides 23' carried by the bar 12 are rods 23. These rods have one of their ends connected to the extremities 22 of the rakes and their opposite ends offset and connected to the rakes so as to provide means for supporting said rakes for longitudinal movement.

Extending from the bar 12 substantially central of the length of said bar is a member 24 which is provided with an opening 25 and passing through this opening and capable of longitudinal movement therein is a bar 26. The inner end of this bar has connected thereto rearwardly and outwardly disposed inclined arms 27, the inner ends of which are connected by a bar 28. The opposite ends of this last mentioned bar are connected by springs 29 to arms 30 which extend from and are secured to the frame of the elevator.

The outer end of the arm 26 has connected thereto one end of a cable 31 which passes over a support 32 which extends from the frame of the elevator 10 and extends downward and rearward to within convenient reach of the operator to enable him to raise the loader from a loaded barge and let it down within an empty one.

The shaft 14 is mounted in bearings 33 which extend from bearing brackets 34 secured to the frame of the elevator 10, the said shaft being connected to a shaft 35 by means of beveled pinions 36. The shaft 35 may be driven from any suitable part of the mechanism of the heading machine for example, the pinion (not shown) on the lower roller of the elevator.

From the foregoing description and accompanying drawings it will be apparent that the invention provides a load leveler which is adapted to be positioned over the top of the header box or barge and operated from the mechanism of a grain heading machine to level the load within said box or barge, the manner of supporting the leveler acting to maintain the same in proper position for use.

The invention is susceptible of various changes in its form, proportions and minor details of construction and the right is herein reserved to make such changes as properly fall within the scope of the appended claims.

Having described the invention what is claimed is:—

1. The combination with a grain header, of a load leveler comprising a frame, a plurality of pivoted and slidable reciprocatory leveling elements mounted in said frame, means whereby said elements may be reciprocated and means for supporting the leveler in position for use.

2. The combination with a grain header, of a load leveler comprising a frame, a crank shaft mounted for rotation in said frame, reciprocatory leveling elements operatively connected to said shaft and guided in said frame, bearing brackets extending from the grain header elevator and receiving said shaft to support the frame for vertical pivotal movement, means connecting the frame and reciprocatory elements to the shaft to permit of horizontal swinging movement, means for yieldingly supporting the frame and means for operatively connecting the shaft to the header mechanism for operating the reciprocatory elements.

3. The combination with a grain header, of a load leveler comprising a frame, a crank shaft mounted for rotation in said frame, reciprocatory leveling elements operatively connected to said shaft and guided in said frame, bearing brackets extending from the grain header elevator and receiving said shaft to support the frame for vertical pivotal movement, means connecting the frame and reciprocatory elements to the shaft to permit of horizontal swinging movement, means including a horizontally disposed spring supported bar connected to the load leveler frame for yieldingly supporting the latter and means for operatively connecting the shaft to the header mechanism for operating the reciprocatory elements.

4. The combination with a grain header, of a load leveler comprising a frame, a crank shaft mounted for rotation in said frame, reciprocatory leveling elements operatively connected to said shaft and guided in said frame, bearing brackets extending from the grain header elevator and receiving said shaft to support the frame for vertical pivotal movement, means connecting the frame and reciprocatory elements to the shaft to permit of horizontal swinging movement, a supporting bar, means including springs secured to the opposite ends of the bar for supporting the latter upon the frame of the header elevator, an arm connected to and extending laterally from the supporting bar, a sliding connection between the arm and frame, means secured to the outer end of the arm for supporting the latter and means for operatively connecting the shaft to the header mechanism for operating the reciprocatory elements.

In testimony whereof I affix my signature.

SUMMEY R. SMART.